C. D. McDONALD.
WORK SEPARATING MEANS.
APPLICATION FILED MAR. 17, 1917.

1,252,279.

Patented Jan. 1, 1918.
2 SHEETS—SHEET 1.

Fig. 1

Fig. 3

WITNESS
Chas. F. Koursh

INVENTOR.
Charles D. McDonald
BY Wm. P. Bond
ATTORNEY

C. D. McDONALD.
WORK SEPARATING MEANS.
APPLICATION FILED MAR. 17, 1917.
1,252,279.
Patented Jan. 1, 1918
2 SHEETS—SHEET 2.
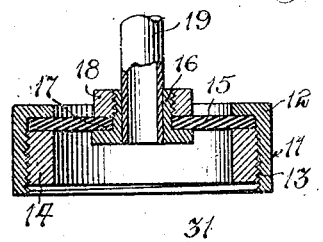
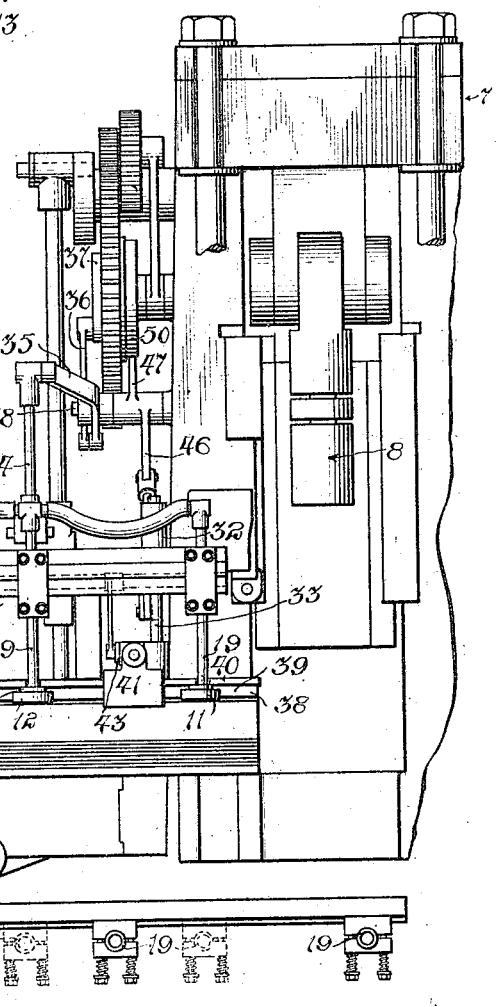
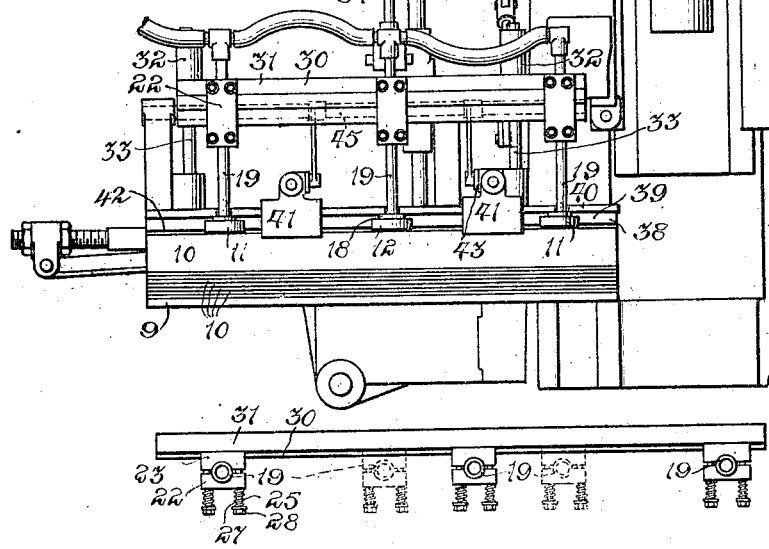
WITNESS
INVENTOR.
Charles D. McDonald.
BY
ATTORNEY

UNITED STATES PATENT OFFICE.

CHARLES D. McDONALD, OF CHICAGO, ILLINOIS.

WORK-SEPARATING MEANS.

1,252,279.   Specification of Letters Patent.   Patented Jan. 1, 1918.

Application filed March 17, 1917. Serial No. 155,449.

*To all whom it may concern:*

Be it known that I, CHARLES D. MC-DONALD, a citizen of the United States, residing at Chicago, in the county of Cook and State of Illinois, have invented certain new and useful Improvements in Work-Separating Means, of which the following is a specification.

The present invention relates to a device for separating sheets of metal, one by one, from a pile, and moving such separated sheets into position to be fed to the operative portions of a die-press or similar machine.

One object of the invention is to provide a series of members in the form of suction cups, and to so mount and arrange these suction cups as to allow them to move into angular positions whereby they may accommodate themselves to an uneven sheet of work.

A further object of the invention is to allow certain of the suction cups to have a greater degree of movement than the remainder, in order to allow all of the cups to come into engagement with an uneven sheet of work.

A further object of the invention is to provide a suction conduit for each of said cups and to arrange a flexible suction supply pipe between said suction conduits.

A further object of the invention is to provide a movable member which, when actuated, will give a back and forth movement to the suction cups, and to arrange a slip connection between the suction cups and the movable member so as to permit of different degrees of movement on the part of the various suction cups when an uneven sheet of work is encountered.

A further object of the invention is to provide means for bringing all of the suction cups into alinement at the terminus of the work separating and moving operation.

A further object of the invention is to provide means for permitting an adjustment of the suction cups with respect to each other, so as to bring them into proper position for acting upon different sized sheets of work.

The invention further consists in the features of construction and combination of parts hereinafter described and claimed.

In the drawings:

Figure 1 is a side view of a portion of a die-press mechanism equipped with the work separating device of the present invention;

Fig. 2, a front view of a portion of a die-press mechanism, showing the device of the present invention in place thereon, and with the suction cups in raised position;

Fig. 3, a detail showing the suction cups in lowered position and acting upon an uneven piece of work;

Fig. 4, a cross-section through one of the suction cups;

Fig. 5, a detail plan view, showing the connection between one of the suction cup conduits and its carrying member, and between the carrying member and the member which is moved to carry the suction cups and work from one position to another; and Fig. 6, a detail plan view, showing how the suction cups may be shifted with respect to one another to accommodate them to different sizes of work.

In the art to which the present invention relates, sheets of work are automatically separated, one by one, from piles by means of movable suction cups, which, when they engage the top sheet, will adhere thereto by suction, and then when the cups are moved, said top sheet will be separated from the pile and transferred or moved into position to be engaged by automatic feed mechanism and fed forward to the acting portions of a die-press or other machine. It frequently happens that these sheets will become uneven and will not lie flat upon the pile or table, so that when the suction cups descend to engage the sheet, all of the cups will not contact the surface of the work. Thus, the work is carried upward by only a portion of the cups and, being thin and flexible, will have a tendency to assume a curved position when not engaged by a sufficient number of cups. When it is so curved, it will not be properly alined for entrance into the feed bar passage, and thus a jamming will occur when it is attempted to strip the work from the cups and place it in the feed bar passage. Also, when work of less dimensions than usual is operated upon, the cups will not be arranged so that all of them will engage the work, some lying outside of the confines of the sheet. Devices are known which automatically break the suction in case all of the cups do not engage the work. With such devices no lifting at all can take place unless all of the cups contact, and when this condition is encountered, it necessarily means a cessation in the work separating operation until the sheet with which imperfect contact was made is removed.

The present invention is intended to so arrange and mount the suction cups as to allow them to at all times make full engagement with the surface of the work, no matter whether the work is lying flat or in an uneven condition, and to enable different sizes of sheets to be handled.

Referring now to the drawings, the device as shown is used in connection with an automatic die-press, which comprises a frame 7 of any suitable structure, which carries a reciprocating die-member 8. A table 9 is provided, upon which is placed a pile of work comprising a plurality of sheets 10; and arranged above this pile are a plurality of suction cups 11. These cups are all of similar construction and will be better understood from Fig. 4. They comprise an outer flanged ring 12, having an interior thread 13. Inside of this flanged ring is placed a collar 14, having an exterior thread 13. meshing with the interior thread 13. A flexible disk 15 is employed, of rubber or other suitable material, which is held in position adjacent the upper portion of the cup member through the coöperation of the collar 14 and the flanged ring 12, as will be apparent from the drawings.

A hollow flanged stud 16 extends through a central opening 17 in the disk 15, and this stud is exteriorly threaded upon its upper end to receive a nut or other suitable member 18, by means of which and the flanged stud a connection is made to the disk 15. Extending through the flanged studding and held with respect to movement therein is a suction conduit 19. There is one of these conduits for each of the suction cups, and they terminate in a three-way coupling 20, which couplings are connected together by means of flexible main supply conduits 21, having communication with a main source of suction supply. The reason for the flexible construction of the main supply conduit will be apparent from the description which will follow.

Each of the conduits 19 passes between an outer block-like member 22 and an inner block-like member 23. These members 22 and 23 are grooved at 24, on their adjacent faces, to receive the conduit 19 (see Fig. 5). Stems 25 pass through the outer block 22 and are threaded at their inner ends in correspondence to the threading in sockets 26 formed in the inner block 22. There is a sliding fit between these stems and the outer block 22. Coil-springs 27 are provided, which encircle each of the stems and rest between the outer face of the outer block 22 and suitable lock nuts 28. These springs exert a constant inward pressure on the block 22 and hence a pressure upon the conduit 19 held between the blocks. This establishes a frictional connection between the block and the conduit, enabling the conduit to move through the blocks under conditions where such movement is desirable, but holding the conduit fixed with respect to the blocks where such fixed relation is desired.

Each of the blocks 23 is provided with a groove 29 on its rear face, and a rib 30 on a bar or rail 31 is arranged to seat within these grooves. The grooves and rib are configured to form a dovetail tongue and groove connection between these parts (see Fig. 1), so that transverse movement of the blocks with respect to the rail is prevented, but longitudinal movement of the blocks along the rail is provided for. This rail 31 has secured thereto sleeves 32 slidably mounted upon guide rods 33, and the rail is moved up and down by means of a link 34 connected to a lever 35, which is rocked by means of a crank arm 36 secured to a disk 37, and this disk is driven through the movements of the main operating shaft of the die-press. At a point where the cups reach their upward limit of movement is positioned a rail or plate 38 formed with an outer cutaway portion to provide an inner shoulder 39 and a flat under face 40.

Reference has been made to the flexible construction of the suction cups. The reason for this construction will be more apparent from a study of Fig. 3, where in an exaggerated form an uneven sheet of work is shown. This sheet of work has become warped, so that it has a tendency to spring upward along its side edges. It is obvious that if the suction cups were rigid instead of flexible, all three of the cups would not engage the surface of this sheet; but by reason of the flexible diaphragm 15, when the suction cups descend, the outer of the cups can assume an angular position in correspondence to the angularity of the outer portions of the sheet of work, and thus all of the cups gain efficient contact with the surface of said sheet. It is also apparent that because of the angularity of the sheet, the outer of the suction cups will engage the surface of the work sooner than the central suction cup. If all of these cups had the same degree of movement, the inner cup would not engage, and consequently there would not be a connection of all the cups with the surface of the work.

It will be recalled that each of the suction cups is carried by a conduit member 19, and that each of these conduits is held by frictional engagement between one of the blocks 22 and its companion block 23. Thus, as the cups move downward, should one of the cups engage the surface of the work sooner than the others, the remaining cups can continue in their downward movement until they engage, while the cup which has first engaged, will move upward through the slippage of its conduit between the blocks 22 and 23. Thus, all of the cups can come into correct engagement with the work, even though some of them are brought into engagement sooner than the others.

The slippage above referred to also enables the cups to move in accordance with the decrease in the size of the pile of work. The normal movement of the power driven means for raising and lowering the cups is such as to carry the cups a distance to reach the lowermost blank on the pile. It is obvious that when the feeding is first started, the pile of blanks is at its highest, and at this time the cups move their shortest distance before reaching the top blank, the power driven means is operating with its normal stroke, and the slippage comes into play to produce a lost motion between the cups and power driven means. This amount of lost motion will become gradually less until the last blank is reached, at which time the cups and power driven means will make the same movement and no lost motion occur.

By the means above outlined, it is apparent that an efficient engagement between all of the suction cups and the work can be effected even though the work be of such irregular nature that with the use of the ordinary and well known suction cup, there will be an imperfect engagement.

When the cups are pulled to their full lifted position, as in Fig. 2, it is desired, first, to brace the cups so that they will not flex when the work is pulled off therefrom and into the feed bar slot, and, second, to realine the suction cups into an even position. The cups when fully lifted lie within the recess of the plate 38, as will be apparent from Fig. 1, and when in such position, a cross-moving finger 41 is brought into action, which strips the work from the suction cups and into the feed bar slot 42. The action of this finger is crosswise of the work and toward the shoulder 39. This shoulder, therefore, braces the cup in the direction of movement of the work off from the cup and prevents the cup flexing during such stripping movement, which flexing would be objectionable, in that it would tend to distort the work and allow it to get out of proper alinement for entrance into the feed slot.

Furthermore, when brought to rest within the cutaway portion of the plate 38, the tops of the suction cups will all engage with the upper face 40 of said plate, so that if an uneven piece of work is being acted upon and the cups thrown into uneven position, as in Fig. 3, the contact with this face 40 will tend to reëstablish all of the cups in a straight alined position, whereby the work will properly strip from the cups and the cups properly actuated for the next feeding operation. When the pile of work is high, the cups move a shorter distance before reaching the face 40 than when the pile is low, so that by contact with the face 40, a lost motion is produced between the cups and the power driven means for raising and lowering them in order to accommodate for the differences in movement between the cups and power driven means as the size of the pile of work changes.

The finger 41, as shown in the drawings, is actuated by means of a link 43 connected to a crank 44, pivoted at 45. The crank is operated through a link 46 connected and operated from a crank 47, pivoted at 48. The free end of this crank 47 is provided with a roller 49, which engages with the periphery of a cam 50 operated from the main drive shaft.

The construction of the device as a whole is very simple and its application does not require any change in the remaining working parts of a die-press. It sometimes happens that shorter or longer sheets of work than usual will be operated upon, and, for illustration, in the instance of shorter pieces being used, the suction cups can be moved into such position to one another as is indicated by the dotted lines in Fig. 6. This is readily and quickly accomplished by simply moving the blocks 23 along the rail 31, and the flexible connections 21 between the suction conduits enables this movement to be made without destroying or impairing the connection between the various suction conduits and the main suction supply conduit. Thus, in addition to efficiently feeding uneven sheets of work, the device is capable of a quick, ready adjustment to accommodate itself to different sizes of work, and can be employed in a manner to meet the unusual conditions encountered in feeding these sheets of metal without in any way impairing its effectiveness as a feeder and separator.

It is, of course, contemplated that structural changes may be made in the invention as illustrated, and it is not intended to be confined other than may be by the terms of the appended claims.

I claim:

1. In a work separating and lifting device, the combination of a plurality of suction cups, means for moving the suction cups toward and from the work, means permitting some of the cups to have a different degree of movement than the remainder to allow contact of all of the cups with irregular sheets of work, and a fixed contact for bringing all of the cups to even alinement at the end of their movement away from the work whereby the piece of work carried by the cups is brought to a straight position when the separating movement is complete, substantially as described.

2. In a work separating and lifting device, the combination of a plurality of suction cups, a carrier for said cups, means for moving the carrier toward and from the work, a friction slip connection between the carrier and cups to permit any cup to have a different distance of travel than the remainder, and means for bringing all of the cups to even alinement at the terminus of their separating movement, substantially as described.

3. In a work separating and lifting device, the combination of a plurality of suction cups, a carrier for said cups, means for moving the carrier toward and from the work, and a frictional connection between the carrier and cups to permit any cup to have a different distance of travel than the remainder, substantially as described.

4. In a work separating and feeding device, the combination of a series of suction cups, a suction conduit associated with each cup, means for moving said cups and conduits toward and from the work, means for permitting any cup and its associated conduit to have a different distance of travel than the remainder, and flexible main suction supply conduits extending between the suction cup conduits, substantially as described.

5. In a work separating and feeding device, the combination of a series of suction cups, a suction conduit associated with each cup, means for moving said cups and conduits toward and from the work, means for permitting any cup and its associated conduit to have a different distance of travel than the remainder, flexible main suction supply conduits extending between the suction cup conduits, and means for bringing all of the cups to even alinement at the terminus of their separating movement, substantially as described.

6. In a work separating and feeding device, the combination of a rail-like common carrying member, means for moving said rail-like member toward and from the work, a series of blocks carried by said rail-like member, a series of suction cups, a conduit member for each cup, there being one block for each conduit, a frictional slip connection between each of said conduit members and its associated block-like member, whereby any suction cup and its associated conduit may have a different distance of travel than the remainder, substantially as described.

7. In a work separating and feeding device, the combination of a rail-like common carrying member, means for moving said rail-like member toward and from the work, a series of blocks carried by said rail-like member, a series of suction cups, a conduit member for each cup, there being one block for each conduit, a frictional slip connection between each of said conduit members and its associated block-like member, whereby any suction cup and its associated conduit may have a different degree of movement than the remainder, and means for bringing all of the cups to even alinement at the terminus of their separating movement, substantially as described.

8. In a work separating and feeding device, the combination of a common carrying member, a series of inner blocks, a tongue and groove connection between said inner blocks and carrying member, a plurality of suction cups, a conduit member associated with each suction cup, an outer block for each of the inner blocks, said blocks being grooved on adjacent faces to permit a conduit member to pass therebetween, means for frictionally holding each of the outer blocks in engagement with its associated conduit, whereby a slip connection between each conduit and the common carrying member is provided, enabling any cup and its associated conduit to have a different distance of travel than the remainder, substantially as described.

9. In a work separating and feeding device, the combination of a common carrying member, a series of inner blocks, a tongue and groove connection between said inner blocks and carrying member, a plurality of suction cups, a conduit member associated with each suction cup, an outer block for each of the inner blocks, said blocks being grooved on adjacent faces to permit a conduit member to pass therebetween, means for frictionally holding each of the outer blocks in engagement with its associated conduit, whereby any cup and its associated conduit may have a different distance of travel than the remainder, and means for bringing all of the cups to even alinement at the terminus of their separating movement, substantially as described.

10. In a work separating and feeding device, the combination of a common carrying member, a series of inner blocks, a tongue and groove connection between said inner blocks and carrying member, a plurality of suction cups, a conduit member associated with each suction cup, an outer block for each of the inner blocks, said blocks being grooved on adjacent faces to permit a conduit member to pass therebetween, means for frictionally holding each of the outer blocks in engagement with its associated conduit, whereby any cup and its associated conduit may have a different distance of travel than the remainder, and a tongue and groove connection between each of the inner blocks and the carrying member to permit adjustment of the cups and their associated conduit members to and from one another to accommodate different sizes of work, substantially as described.

11. In a work separating and feeding device, the combination of a rail-like member forming a common carrier, means for moving said rail-like member toward and from the work, a series of blocks carried by said rail-like member, a series of suction cups, means permitting each of said cups to move to a different position of angularity and accommodate itself to irregular sheets of work, a conduit member for each cup, and a slip connection between each of said conduit members and one of said blocks to permit any cup and its associated conduit to have a different distance of travel than the remainder, substantially as described.

12. In a work separating and lifting device, the combination of a suction cup, means permitting said cup to move to different positions of angularity to accommodate itself to irregular sheets of work, means for actuating said cups toward and from the work, means for stripping the work from the cups at the terminus of the separating movement, and means for holding the cups against flexing during the stripping operation, substantially as described.

13. In a work separating and lifting device, the combination of a plurality of suction cups, a carrier for said cups, means for moving the carrier toward and from the work, a slip connection between the carrier and cups to permit any cup to have a different distance of travel than the remainder, means for bringing all of the cups to even alinement at the terminus of their separating movement, means for stripping the work from the cups at the terminus of the separating movement, and means for holding the cups against flexing during the stripping operation, substantially as described.

14. In a work separating and lifting device, a plurality of suction cups, an individual conduit for each cup in the form of a rigid pipe, a common carrier for all of said conduits, means for moving the carrier to move the cups and conduits toward and from the work, and a frictional connection between the carrier and each of the conduits, whereby any cup and its associated conduit may have a different distance of travel than the remaining cups and conduits, substantially as described.

15. In a work separating and lifting device, the combination of a plurality of suction cups, an individual conduit for each cup in the form of a rigid pipe, a connection between each conduit and its associated cup to permit any of said cups to move to a desired position of angularity with respect to its associated conduit, a common carrier for all of said conduits, means for moving the carrier toward and from the work, and a frictional slip connection between the carrier and each of the conduits to permit any cup and its associated conduit to have a different distance of travel from the remaining cups and conduits, substantially as described.

CHARLES D. McDONALD.